K. H. V. VON PORAT.
FEEDING DEVICE FOR PULVEROUS FUEL IN FURNACES FOR LOCOMOTIVES AND THE LIKE.
APPLICATION FILED OCT. 12, 1916.
1,337,738.
Patented Apr. 20, 1920.
2 SHEETS—SHEET 1.
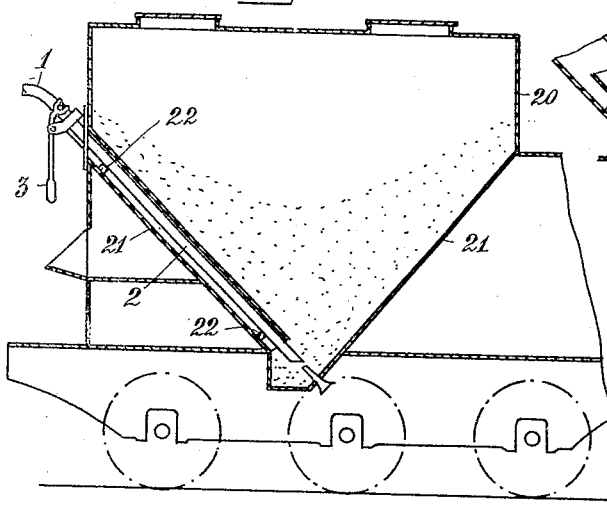
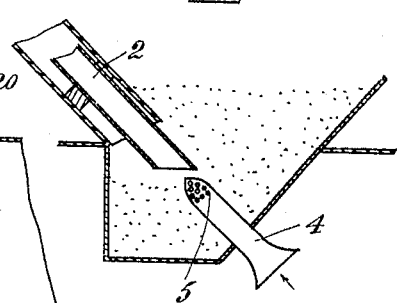
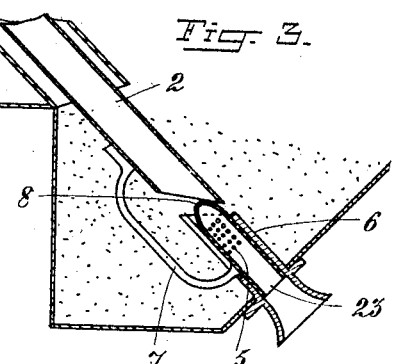
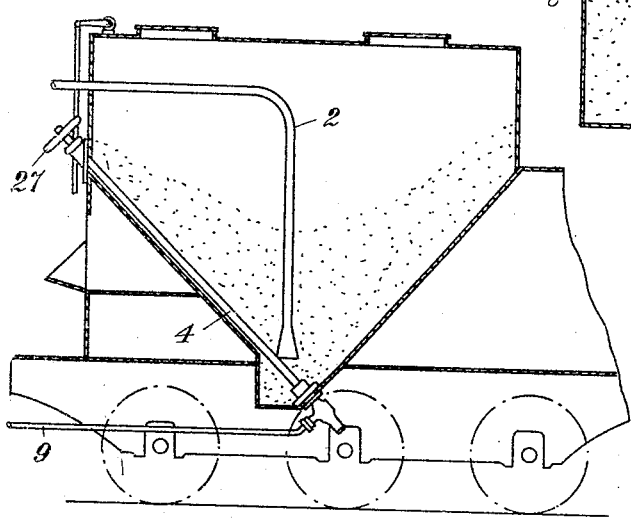

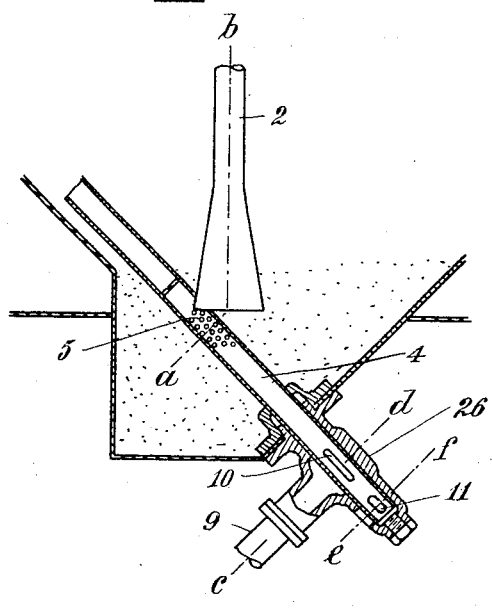
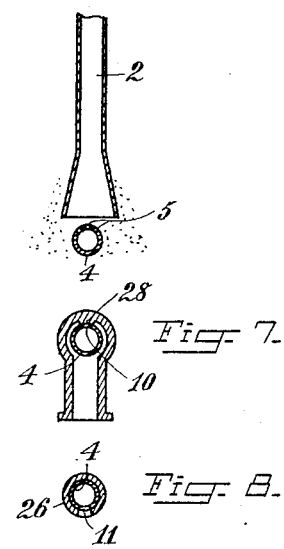
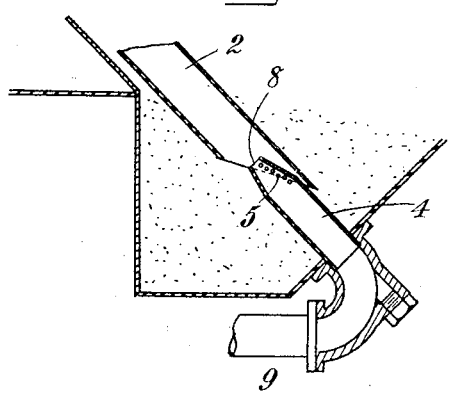
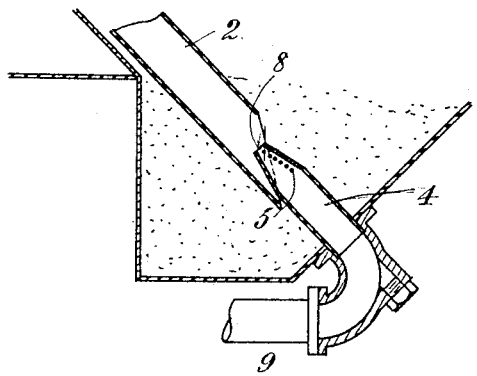

UNITED STATES PATENT OFFICE.

KARL HJALMAR VILHELM von PORAT, OF STOCKSUND, SWEDEN, ASSIGNOR TO MOTALA VERKSTADS NYA AKTIEBOLAG, OF MOTALA VERKSTAD, SWEDEN.

FEEDING DEVICE FOR PULVEROUS FUEL IN FURNACES FOR LOCOMOTIVES AND THE LIKE.

1,337,738.  Specification of Letters Patent.  Patented Apr. 20, 1920.

Application filed October 12, 1916. Serial No. 125,223.

*To all whom it may concern:*

Be it known that I, KARL HJALMAR VILHELM VON PORAT, a subject of the King of Sweden, residing at Stocksund, in the Kingdom of Sweden, have invented certain new and useful Improvements in Feeding Devices for Pulverous Fuel in Furnaces for Locomotives and the like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has reference to feeding devices for pulverous fuel in furnaces for locomotives and other engines in which the powder is fed by means of a gaseous medium that is pressed or sucked through the powder conduit.

The invention relates to certain arrangements in the powder feeding pipe and in the supply pipe for the gaseous medium.

The invention is mainly characterized by the fact that the supply pipe for the gaseous medium is provided with a number of openings, situated at different distances from the powder conduit or at different depths in the powder mass. The outlet of the powder conduit between the furnace and the powder reservoir into this reservoir is further so situated that the powder will not automatically, that is by its own weight, penetrate into the conduit.

By this arrangement the advantage is obtained that foreign bodies in the powder, such as screws, nuts, cotton waste, etc., which bodies have become mixed with the powder during the manufacturing of same and during the filling of the reservoir, can not penetrate into the powder conduit and choke up the same, but will remain lying at the side of the outlet of the powder conduit, so that they do not interfere with the powder feed.

In practice it has been found that when the outlet of the powder conduit into the reservoir is so situated that the powder automatically streams into the conduit, disturbances in the feed and accordingly interruptions in traffic are very likely to occur.

Further there is provided by means of the said arrangement a better and more steady regulation of the powder as it must first be whirled up by the air or gas current before it streams into the mouth of the powder conduit under the influence of the current.

The gaseous medium should be led into the powder reservoir at or close to the bottom or to the inclined walls of the reservoir in such a manner that the said medium is forced to penetrate and stir the powder or force its way between the bottom and the powder, whereby the formation of arches is avoided and the powder is more easily fed into the reservoir.

According to the preferred embodiment of the invention the powder feed is regulated by means of the endwise displacement or the rotation of the whole or part of the powder pipe that passes downward through the powder mass and through which the powder is led to the furnace, or by a corresponding movement of the air or gas supply pipe or by an adjustment of both these pipes.

According to certain embodiments of the invention two or more powder feed pipes enter the powder reservoir, whereby an almost complete safety is gained against interruptions in the powder feed, because if one conduit for some reason should not work, the other may still be used. Preferably a form adapted to the double or multitudinous feed is thereby given to the reservoir, whereby a greater volume is obtained for the powder and the feed will be more effective.

The invention is illustrated in the accompanying drawings.

Figure 1 shows a longitudinal section of a tender for pulverous fuel with a feed apparatus according to the present invention. Fig. 2 shows the air entrance pipe and the end of the powder pipe in the powder reservoir on a larger scale. Fig. 3 is a similar illustration of a somewhat modified construction. Fig. 4 shows similarly to Fig. 1 another embodiment of the invention. Figs. 5–8 show on a larger scale details of the last-named embodiment. Figs. 6, 7 and 8 are sections on the lines *a—b*, *c—d* and *e—f* in Fig. 5. Figs. 9 and 10 represent another embodiment.

In the arrangement according to Figs. 1 and 2 the air current necessary for the feed is effected by means of suction in the powder conduit, whereby the part of the conduit situated in the powder reservoir 20 consists of a metal pipe 2 that extends close to one of the two inclined walls 21 of the reservoir and has its outlet comparatively close to the bottom of the reservoir. The continuation of the powder conduit outside the powder reservoir is indicated with 1.

The air supply pipe 4 has its inner end placed opposite the outlet of the powder pipe 2 into the reservoir and projects with its outer, preferably somewhat widened end into the free air outside the wall of the reservoir. The inner cone-shaped end of the pipe 4 is provided with holes 5. By the suction in the powder conduit, air will thus stream through the pipe 4 and the holes 5 into the reservoir, so that the powder is whirled up and thus is easily led through the powder conduit to the furnace.

The pipe 2 is movably held in the guide 22, so that it may be displaced by means of a lever 3, that may be secured in different positions and is arranged outside the reservoir, whereby the displacement takes place in the longitudinal direction of the pipe, that is in the direction to or from the air supply pipe 4, whereby the powder feed in the former case is diminished and in the other case increased. The powder pipe 2 thus forms a regulating organ for the feed.

According to the somewhat modified arrangement shown in Fig. 3 the air supply pipe is formed of two pipe-formed parts, namely an outer pipe 6 that is attached to the reservoir and an inner pipe 23 that may slide in the outer pipe 6 and is provided with a number of side holes 5 and a hole 8 at the end. The pipe 23 is further by means of a bar 7 connected with the pipe 2, so that these two pipes 23 and 2 are displaced when the lever 3 (Fig. 1) is operated. When the inner pipe 23 is nearly completely pushed into the outer pipe 6 as in Fig. 3, the holes 5 are closed, so that practically no feed of powder takes place. According to how much the pipe 23 is pulled out of the pipe 6, when the pipe 23 is displaced upward together with the pipe 2, the feed is increased, as continually an increased number of holes are opened, so that air may pass through these holes and whirl up the powder. In this embodiment the powder pipe as well as the air entrance pipe serve as regulating organs for the feed. The upper end of the shell 6 is cut off obliquely, so that its mouth lies in a horizontal plane. By means of this arrangement a better adjustment is obtained.

Through the hole 8 air streams out and gives the powder in the pipe 2 the necessary speed, which especially is required when only part of the holes 5 are open.

In the embodiments according to Figs. 4-8 the air current is effected by means of compressed air that is supplied through the pipe 9. The air pipe 4 serves as regulating organ for the feed and is inclined at a certain angle with respect to the adjacent part of the powder pipe 2, at the same time being rotatable around its own longitudinal axis. The lower end of the pipe 4 is rotatably held in a pipe 26 that connects the pipe with the compressed air pipe 9.

The pipe has a prolongation that extends upward through the front wall of the reservoir and is provided with a handwheel 27 outside that wall. That portion of this pipe which is adjacent to the powder pipe is provided with a number of holes 5. The holes are however in this modification not arranged around the whole circumference of the pipe but only on one side as is shown in Figs. 5 and 6.

From the pipe 9 the air enters the pipe 4 through the slot 10. When the holes 5 on the pipe 4 are turned upward, that is against the mouth of the powder pipe 2, the hole 10 is closed by a list 28 on the inside of the pipe 26. The feed is then entirely shut off as no air can enter the powder reservoir. As soon as the pipe 4 is turned in the one or other direction by means of the hand-wheel 27 the hole 10 is opened and according to how much the hand-wheel has been turned, the holes 5 will enter more or less deeply into the mass and more or less powder be whirled up by the air streaming in. By turning the handwheel the feed of the powder may be easily regulated.

The powder that has accidentally penetrated into the pipe 4 through the holes 5 may stream out through holes 11 (Figs. 5 and 8) in the pipe 4 and the casing 26. These holes 11 are only open when the feed is shut off as is shown on the drawing.

According to the embodiment shown in Figs. 9 and 10 the feed is regulated by turning the powder pipe 2. The air pipe 4 entering the reservoir is connected with a compressed air pipe 9 and is fixed, and further it is provided at its upper side with holes 5, through which air streams out and whirls up the powder, and at its end with a hole 8 through which air streams out and blows the powder through the conduit 2 to the furnace. Fig. 9 shows the position of the powder pipe when the feed is shut off, while Fig. 10 shows the position of same at full feed.

What I claim is:

1. In a feeding device for pulverulent fuel for furnaces, the combination of a powder receptacle, a fuel pipe extending from said receptacle to the furnace, a pipe for supplying air or other gaseous medium into the mass in said receptacle, means for causing an air current or currents from said air supply pipe to penetrate, whirl up and bring along with it a quantity of fuel from the receptacle through the fuel pipe, means for preventing said current from flowing in a straight line from the discharge part of the gas supply pipe into the receiving opening of the fuel pipe, said discharge part being rotatably mounted in the receptacle, and means for varying the distance between the discharge part of the air supply pipe and the receiving opening of the fuel pipe by an angular adjustment of said part without moving it endwise.

2. In a feeding device for pulverulent fuel for furnaces, the combination of a powder receptacle, a fuel pipe extending from said receptacle to the furnace, a pipe for supplying air or other gaseous medium into the mass in said receptacle, means for causing an air current or currents from said air supply pipe to penetrate, whirl up and bring along with it a quantity of fuel from the receptacle through the fuel pipe, the lower part of the receptacle having walls converging downwardly, the discharge part of the air supply pipe being adjustable in relation to the other part of the pipe and extending along and near one of said converging walls and at an angle to the receiving end of the fuel pipe.

3. In a feeding device for pulverulent fuel for furnaces, the combination of a powder receptacle, a fuel pipe extending from said receptacle to the furnace, a pipe for supplying air or other gaseous medium into the mass in said receptacle, means for causing an air current or currents from said air supply pipe to penetrate, whirl up and bring along with it a quantity of fuel from the receptacle through the fuel pipe, means for preventing said current from flowing in a straight line from the discharge part of the air supply pipe into the receiving opening of the fuel pipe, said discharge part being rotatably mounted in the receptacle, and means for varying the distance between the discharge part of the air supply pipe and the receiving opening of the fuel pipe by an angular adjustment of said part without moving it endwise, the outlet of the air supply pipe consisting of a plurality of fine holes located substantially on only one side of the wall of said air supply pipe.

4. In a feeding device for pulverulent fuel for furnaces, the combination of a powder receptacle, a fuel pipe extending from said receptacle to the furnace, a pipe for supplying air or other gaseous medium into the mass in said receptacle, means for causing an air current or currents from said air supply pipe to penetrate, whirl up and bring along with it a quantity of fuel from the receptacle through the fuel pipe, the lower part of the receptacle having walls converging downwardly, the discharge part of the air supply pipe being adjustable in relation to the other part of the pipe and extending along and near one of said converging walls and at an angle to the receiving end of the fuel pipe, the outlet of the air supply pipe consisting of a plurality of fine holes located substantially on only one side of the wall of said air supply pipe.

5. In a device for supplying pulverulent fuel to a locomotive furnace, the combination of a tender having a powder receptacle, a fuel pipe extending from said receptacle to the furnace, a pipe for supplying air or other gaseous medium into the mass in said receptacle, means for causing an air current or currents from said air supply pipe to penetrate, whirl up and bring along with it a quantity of fuel from the receptacle through the fuel pipe, one of the adjacent pipe ends being adjustable and projecting through the front wall of the tender, and a handle on that adjustable pipe end on the outside of the tender, said handle being conveniently accessible from the driver's cabin.

6. In a feeding device for pulverulent fuel for furnaces, the combination of a powder receptacle, a fuel pipe extending from said receptacle to the furnace, a pipe for supplying air or other gaseous medium into the mass in said receptacle, means for causing an air current or currents from said air supply pipe to penetrate, whirl up and bring along with it a quantity of fuel from the receptacle through the fuel pipe, means for preventing said current from flowing in a straight line from the discharge part of the air supply pipe into the receiving opening of the fuel pipe, said discharge part being rotatably mounted in the receptacle, and means for varying the distance between the discharge part of the air supply pipe and the receiving opening of the fuel pipe by an angular adjustment of said part without moving it endwise, the outlet of the air supply pipe and the receiving opening of fuel pipe being located in the lower part of the receptacle but at some distance from the bottom thereof, and means for preventing the fuel from falling by gravity into the fuel pipe.

7. In a feeding device for pulverulent fuel for furnaces, the combination of a powder receptacle, a fuel pipe extending from said receptacle to the furnace, a pipe for supplying air or other gaseous medium into the mass in said receptacle, means for causing an air current or currents from said air supply pipe to penetrate, whirl up and bring along with it a quantity of fuel from the receptacle through the fuel pipe, the lower part of the receptacle having walls converging downwardly, the discharge part of the air supply pipe being adjustable in relation to the other part of the pipe and extending along and near one of said converging walls and at an angle to the receiving end of the fuel pipe, the outlet of the air supply pipe and the receiving opening of the fuel pipe being located in the lower part of the receptacle but at some distance from the bottom thereof, and means for preventing the fuel from falling by gravity into the fuel pipe.

8. In a feeding device for pulverulent fuel for furnaces, the combination of a powder receptacle, a fuel pipe extending from said receptacle to the furnace, a pipe for supplying air or other gaseous medium into the mass in said receptacle, means for causing an air current or currents from said air supply pipe to penetrate, whirl up and bring along with it a quantity of fuel from the receptacle through the fuel pipe, means for preventing said current from flowing in a straight line from the discharge part of the air supply pipe into the receiving opening of the fuel pipe, said discharge part being rotatably mounted in the receptacle, and means for varying the distance between the discharge part of the air supply pipe and the receiving opening of the fuel pipe by an angular adjustment of said part without moving it endwise, the outlet of the air supply pipe consisting of a plurality of fine holes located substantially on only one side of the wall of said air supply pipe, the outlet of the air supply pipe and the receiving opening of the fuel pipe being located in the lower part of the receptacle but at some distance from the bottom thereof, and means for preventing the fuel from falling by gravity into the fuel pipe.

9. In a feeding device for pulverulent fuel for furnaces, the combination of a powder receptacle, a fuel pipe extending from said receptacle to the furnace, a pipe for supplying air or other gaseous medium into the mass in said receptacle, means for causing an air current or currents from said air supply pipe to penetrate, whirl up and bring along with it a quantity of fuel from the receptacle through the fuel pipe, the lower part of the receptacle having walls converging downwardly, the discharge part of the air supply pipe being adjustable in relation to the other part of the pipe and extending along and near one of said converging walls, and at an angle to the receiving end of the fuel pipe, the outlet of the air supply pipe consisting of a plurality of fine holes located substantially on only one side of the wall of said air supply pipe, the outlet of the air supply pipe and the receiving opening of the fuel pipe being located in the lower part of the receptacle but at some distance from the bottom thereof, and means for preventing the fuel from falling by gravity into the fuel pipe.

10. In a device for supplying pulverulent fuel to a locomotive furnace, the combination of a tender having a powder receptacle, a fuel pipe extending from said receptacle to the furnace, a pipe for supplying air or other gaseous medium into the mass in said receptacle, means for causing an air current or currents from said air supply pipe to penetrate, whirl up and bring along with it a quantity of fuel from the receptacle through the fuel pipe, one of the adjacent pipe ends being adjustable and projecting through the front wall of the tender, and a handle on that adjustable pipe end on the outside of the tender, said handle being conveniently accessible from the driver's cabin, the outlet of the air supply pipe and the receiving opening of the fuel pipe being located in the lower part of the receptacle but at some distance from the bottom thereof, and means for preventing the fuel from falling by gravity into the fuel pipe.

11. In a feeding device for pulverulent fuel for furnaces, the combination of a powder receptacle, a fuel pipe extending from said receptacle to the furnace, a pipe for supplying air or other gaseous medium into the mass in said receptacle, means for causing an air current or currents from said air supply pipe to whirl up and bring along with it a quantity of fuel from the receptacle, the discharge part of the air supply pipe being rotatable and having an outlet only on one side thereof, means for facing said outlet toward or from the receiving opening of the fuel pipe by an angular adjustment of said discharge part, and means for interrupting the supply of air to the said discharge part automatically, when the said outlet is faced toward said receiving opening.

12. In a feeding device for pulverulent fuel for furnaces, the combination of a powder receptacle, a fuel pipe extending from said receptacle to the furnace, a pipe for supplying air or other gaseous medium into the mass in said receptacle, means for causing an air current or currents from said air supply pipe to penetrate, whirl up and bring along with it a quantity of fuel from the receptacle through the fuel pipe, the discharge end of said air supply pipe being adjustably mounted in two opposite walls of the receptacle, the outlet of the air supply pipe and the receiving opening of the fuel pipe being located in the lower part of the receptacle but at some distance from the bottom thereof, and means for preventing the fuel from falling by gravity into the fuel pipe.

In testimony that I claim the foregoing as my invention, I have signed my name in presence of two subscribing witnesses.

KARL HJALMAR VILHELM von PORAT.

Witnesses:
GUSTAF ADOLF ALSON,
GRETA PRIEN.